United States Patent
Close, Jr.

[11] Patent Number: 5,755,161
[45] Date of Patent: May 26, 1998

[54] CHOCK BOX FOR AUTOMOBILE TRANSPORT RAILROAD CARS

[76] Inventor: John W. Close, Jr., 550 Shorewood La., Waterloo, Nebr. 68069

[21] Appl. No.: 762,511
[22] Filed: Dec. 10, 1996
[51] Int. Cl.⁶ .................................................. B61D 15/00
[52] U.S. Cl. ........................... 105/355; 220/481; 220/675
[58] Field of Search ................................. 105/355, 375, 105/409; 220/476, 481, 669, 675

[56] References Cited

U.S. PATENT DOCUMENTS

| | | | |
|---|---|---|---|
| 4,875,813 | 10/1989 | Moyer et al. | 410/9 |
| 4,971,492 | 11/1990 | Moyer et al. | 410/9 |
| 5,183,180 | 2/1993 | Hawkins et al. | 220/673 |
| 5,464,115 | 11/1995 | Tisbo et al. | 220/675 |
| 5,531,379 | 7/1996 | Hammett | 238/1 |

Primary Examiner—S. Joseph Morano
Attorney, Agent, or Firm—Henderson & Sturm

[57] ABSTRACT

A polyethylene chock box which is secured to the railroad car sidescreen by means of removable blind fasteners, thereby greatly decreasing labor costs and well as future maintenance expenses. The chock boxes have a contoured lower surface with drain holes to permit water to drain from the boxes and to permit water to flow beneath the boxes so the railroad car can drain as well. The resilient polyethylene prevents the chipping and denting of the vehicle doors, while also reducing weight.

4 Claims, 1 Drawing Sheet

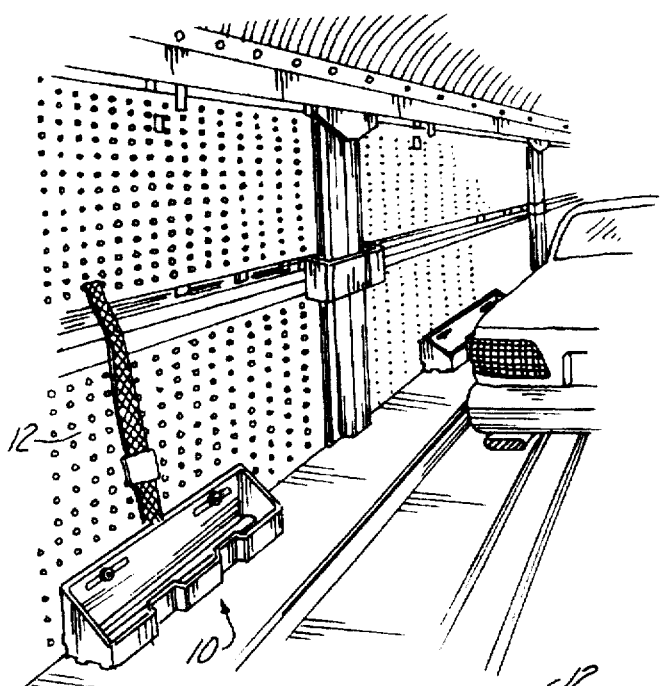
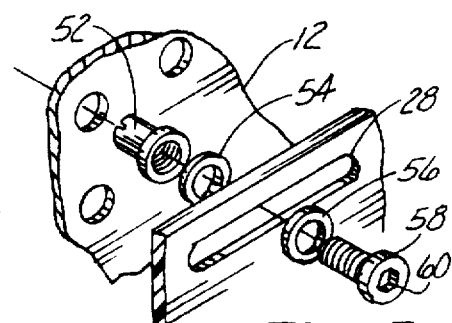
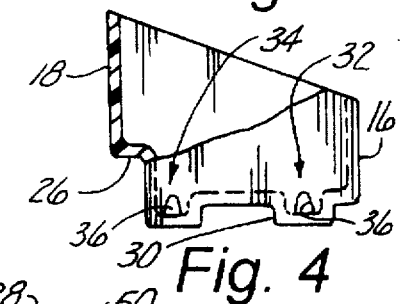
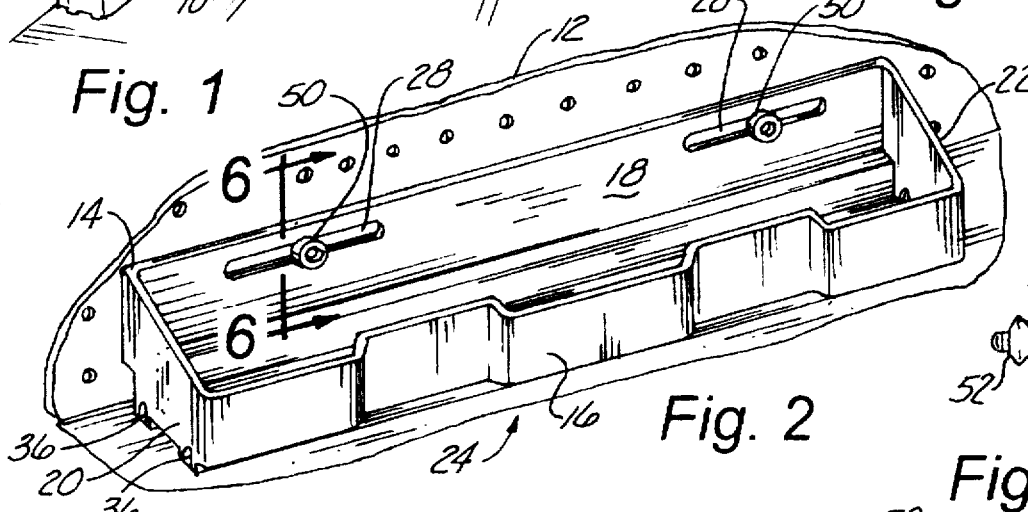
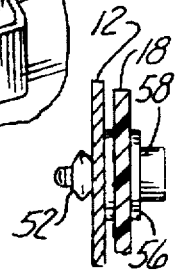
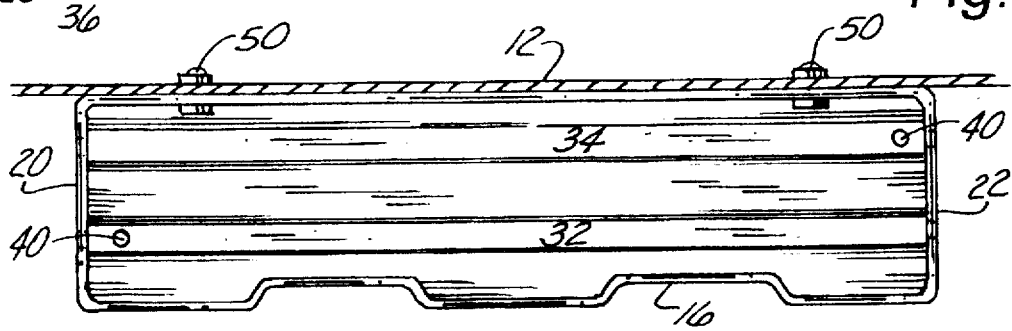

CHOCK BOX FOR AUTOMOBILE TRANSPORT RAILROAD CARS

CROSS-REFERENCE TO RELATED APPLICATIONS

Not Applicable.

STATEMENT REGARDING FEDERALLY SPONSORED RESEARCH OR DEVELOPMENT

Not Applicable.

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to an apparatus for storing automobile chocks within an automobile transport railroad car, and more particularly to an improved chock storage box which is removably mountable to the side screen of the railroad car.

2. Description of the Related Art

Automobile transport railroad cars are used in the railroad industry for the transportation of automobiles and trucks from the factories to distribution points and dealers. The most common of these railroad cars carry six vehicles on each of three decks, for a total of eighteen vehicles. Further, the railroad cars utilize sidescreens of perforated sheet metal to enclose the vehicles carried therein to prevent vandalism. After the vehicles are driven into the railroad cars, the wheels of the vehicles are chocked to prevent the vehicle from rolling. When the vehicles are to be removed from the railroad cars, the chocks are removed from the wheels and are placed into metal storage boxes which are welded to the railroad cars. These metal chock storage boxes are less than satisfactory in that they often chip and dent vehicle doors. The metal storage boxes are also labor intensive when they are installed or removed, and when they rust and must be cleaned and repainted or replaced.

Those concerned with these and other problems will therefore recognize the need for an improved chock box for automobile transport railroad cars.

BRIEF SUMMARY OF THE INVENTION

The present invention discloses a polyethylene chock box which is secured to the railroad car sidescreen by means of removable blind fasteners, thereby greatly decreasing labor costs as well as future maintenance expenses. The chock boxes have drain holes in each end to permit water to escape from the boxes and have a contoured lower surface to allow water to flow beneath the box so the railroad car can drain as well. The resilient polyethylene prevents the chipping and denting of the vehicle doors, while also reducing weight.

Therefore, an object of the present invention is the provision of an improved chock box for automobile transport railroad cars.

Another object of the invention is to provide a chock box which does not damage the vehicle doors.

Another object is to increase safety by increasing walkway clearance.

A further object is to provide a chock box which is easily installed and removed.

Still a further object is to provide a chock box which does not require continuing maintenance.

These and other objects will be apparent to those skilled in the art.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein:

FIG. 1 is a perspective view of the invention secured to the sidescreen of an automobile transport railroad car;

FIG. 2 is a frontal perspective view of the invention as depicted in FIG. 1;

FIG. 3 is a top plan view of the invention;

FIG. 4 is an end view of the invention in partial section;

FIG. 5 is a close-up view of the installation of a blind fastener of the invention; and FIG. 6 is a sectional view taken along line 6-6 of FIG. 2 depicting a secured blind fastener.

DETAILED DESCRIPTION OF THE INVENTION

Referring now to the drawings, wherein like reference numerals designate identical or corresponding parts throughout the several views, FIG. 1 shows the invention depicted generally at 10 where it is secured to the perforated sidescreen 12 of an automobile transport railroad car. The invention 10, preferably fabricated from molded polyethylene, includes an elongate tray 14 capable of holding two pairs of wheel chocks (not shown). The elongate tray 14 comprises a contoured front wall 16, a back wall 18, preferably somewhat taller than the front wall 16, a first end 20 and a second end 22, and a contoured bottom 24.

Referring primarily to FIGS. 3 and 4, the bottom 24 of the tray 14 is seen to be contoured with a central channel 30 running lengthwise from end to end. This central channel 30, in conjunction with the front wall 16 and back wall 18 forms interior front and rear water drainage channels 32, 34 running the length of the tray 14. In communication with the drain holes 36 formed in the ends of the tray, these channels 32, 34 tend to more effectively collect rain and melted snow and funnel the water to the drain holes 36, keeping the interior of the tray relatively dry.

The back wall 18 is a vertical flat surface with a shoulder 26 along its lower edge to accommodate a floor edging in some rail cars, although not present in this particular rail car. The shoulder 26 also serves as a water passageway which, in conjunction with the channel 30, greatly aids in the drainage of rain and melting snow from the rail car. The back wall 18 also includes two horizontal-slots 28 formed adjacent its upper edge for receipt of blind fasteners 50 for securing the tray to the sidescreen 12. Also seen in FIG. 3 are two apertures 40 which may be used to secure the tray 14 to the floor of the rail car if necessary.

Referring now to FIGS. 5 and 6, the blind fasteners 50 of the invention are seen to comprise a threaded insert 52, first and second washers 54, 56, and a bolt 58 having a hexagonal drive socket 60. To secure the invention to the rail car sidescreen 12, the threaded insert 52, fabricated from a resilient material such as neoprene, is first placed within a hole in the perforated sidescreen 12. The bolt 58 is then inserted through the washers 54, 56 and slot 28 and is threaded into the insert 52. As the bolt 58 is tightened, the insert 52 is compressed and expands against the rear of the sidescreen 12 as best seen in FIG. 6. When removing the invention from the sidescreen 12, as the bolt 58 is loosened, the resilient insert 52 resumes its original cylindrical shape and can be withdrawn from the aperture in the sidescreen if so desired.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A chock box for automobile transport railroad cars having sidescreens of perforated sheet metal, comprising:

an elongate tray having a first end and a second end, a back wall and a front wall, and a contoured bottom;

said contoured bottom having an upper surface and a lower surface, said upper surface having a front and a rear water drainage channel and said lower surface having a central water drainage channel;

said first end and second end each having front and rear drain holes in communication with said front and rear water drainage channels.

2. The chock box as recited in claim 1 wherein said back wall includes at least one elongate slot for receipt of a blind fastener.

3. The chock box as recited in claim 2 wherein said back wall is taller than said front wall.

4. In combination, a railroad car sidescreen having a plurality of openings therethrough; and a chock box removably secured to said sidescreen, said chock box comprising: an elongate tray having a first end and a second end, a back wall and a front wall, and a contoured bottom;

said contoured bottom having an upper surface and a lower surface, said upper surface having a front and a rear water drainage channel and said lower surface having a central water drainage channel;

said first end and second end each having front and rear drain holes in communication with said front and rear water drainage channels.

* * * * *